US008902885B2

(12) United States Patent
Frezzolini

(10) Patent No.: US 8,902,885 B2
(45) Date of Patent: Dec. 2, 2014

(54) PACKET COMMUNICATION BETWEEN A COLLECTING UNIT AND A PLURALITY OF CONTROL DEVICES AND OVER THE POWER SUPPLY LINE

(75) Inventor: Aleandro Frezzolini, Arezzo (IT)

(73) Assignee: Power-One Italy S.p.A., Terranuova Bracciolini, Arezzo (IT)

( * ) Notice: Subject to any disclaimer, the term of this patent is extended or adjusted under 35 U.S.C. 154(b) by 1149 days.

(21) Appl. No.: 10/551,592

(22) PCT Filed: Mar. 24, 2004

(86) PCT No.: PCT/IT2004/000149
§ 371 (c)(1),
(2), (4) Date: Jul. 27, 2006

(87) PCT Pub. No.: WO2004/088871
PCT Pub. Date: Oct. 14, 2004

(65) Prior Publication Data
US 2007/0019613 A1   Jan. 25, 2007

(30) Foreign Application Priority Data
Mar. 31, 2003 (EP) .................................. 03425199

(51) Int. Cl.
| H04L 12/28 | (2006.01) |
| H04J 3/24 | (2006.01) |
| G08C 19/04 | (2006.01) |
| H04L 25/60 | (2006.01) |
| H04B 3/54 | (2006.01) |
| H04L 12/403 | (2006.01) |

(52) U.S. Cl.
CPC ...... H04L 12/403 (2013.01); *H04B 2203/5408* (2013.01); H04B 3/542 (2013.01); *H04B 2203/5441* (2013.01); *H04B 2203/5458* (2013.01)

USPC ... 370/389; 370/475; 340/870.11; 340/12.32; 375/214

(58) Field of Classification Search
CPC ............ H04L 5/14; H04L 25/20; H04B 3/54; H04B 3/542; H04B 3/58; H04Q 9/00
USPC .............. 370/475, 389; 379/406.01; 340/288, 340/310.11, 538, 12.22, 12.32, 870.03, 340/870.11; 375/214
See application file for complete search history.

(56) References Cited

U.S. PATENT DOCUMENTS

| 4,638,298 | A  | * | 1/1987 | Spiro ............................. 370/392 |
| 4,692,761 | A  | * | 9/1987 | Robinton ................. 340/825.01 |
| 2001/0024441 | A1 | * | 9/2001 | Bateman et al. ............... 370/362 |
| 2003/0097482 | A1 | * | 5/2003 | DeHart et al. ................. 709/253 |
| 2003/0103521 | A1 | * | 6/2003 | Raphaeli et al. .............. 370/445 |

FOREIGN PATENT DOCUMENTS

| EP | 0 852 419 | A2 | 7/1998 | |
| EP | 0852419 | * | 7/1998 | .............. H02J 13/00 |
| WO | WO 03/010896 | A1 | 2/2003 | |

* cited by examiner

*Primary Examiner* — Un C Cho
*Assistant Examiner* — Jeremy Costin
(74) *Attorney, Agent, or Firm* — Waddey Patterson; Mark J. Patterson

(57) ABSTRACT

A communication method between a collecting unit (5) and a plurality of control devices (7i), each of which is associated with at least an electrical device 1(i) via the power line. Messages are exchanged between the collecting unit (5) and the control devices (7i), each of which contains at least: a progressive message number (Pr_N); an addressee identification number assigned to each control device and to the collecting unit. The messages are therefore addressable selectively to a specific control device via said addressee identification number.

19 Claims, 9 Drawing Sheets

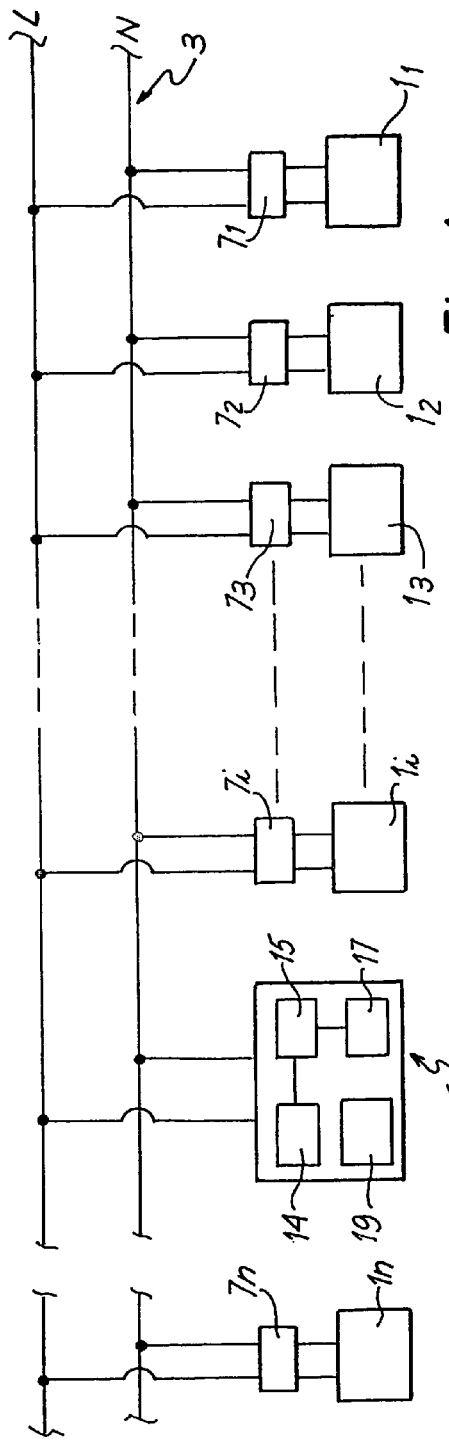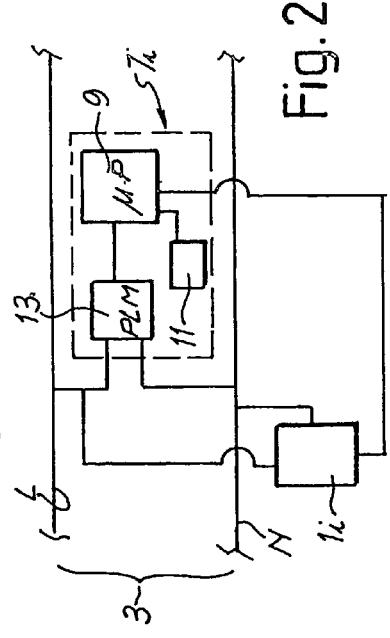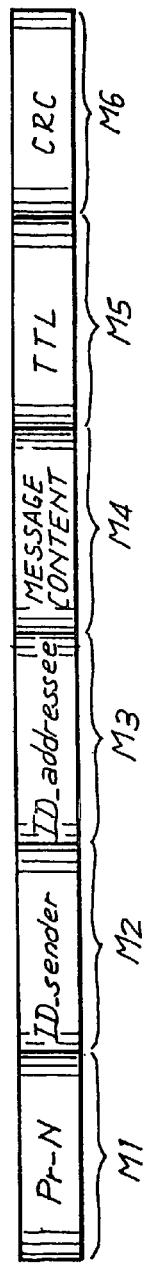

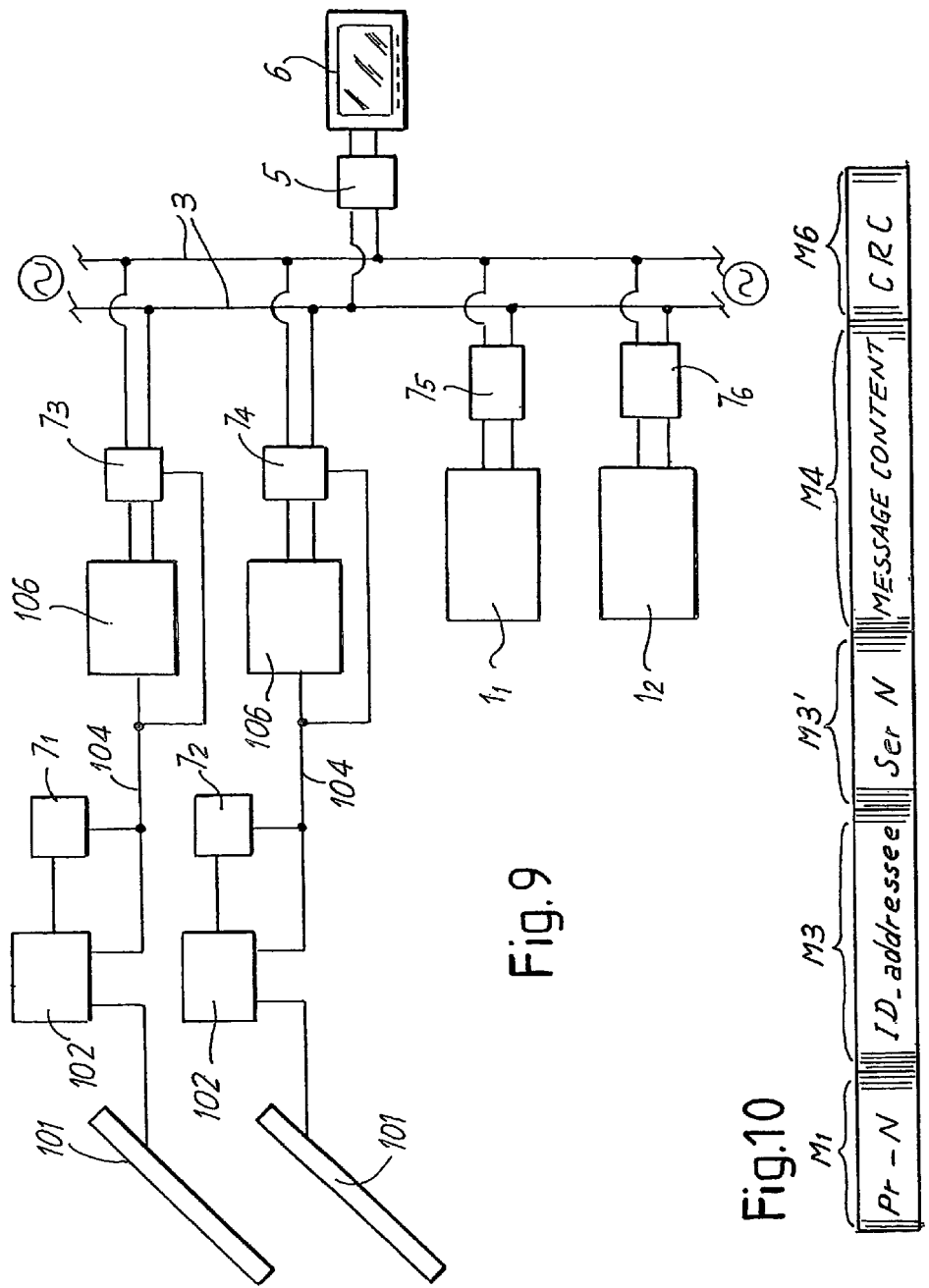

PACKET COMMUNICATION BETWEEN A COLLECTING UNIT AND A PLURALITY OF CONTROL DEVICES AND OVER THE POWER SUPPLY LINE

BACKGROUND OF THE INVENTION

The present invention relates to a method to allow the transmission of data between a collecting unit and a plurality of control devices, and a system that utilizes this transmission method. The invention also relates to a control device to implement a method of the type indicated above.

More specifically, the invention relates to a system comprising a plurality of electrical devices, each associated with a control device and wherein the various control devices can communicate receiving and/or transmitting data, information or commands towards and from a central data collecting unit through a common communication channel. In particular, although not exclusively, the invention relates to a system wherein the transmission of data takes place via power line carrier transmission along the power supply line of the various electrical devices to which the control devices are associated.

In many industrial and civil sectors it may be useful to have a system that allows the exchange of information or data between a control or data collecting unit and a plurality of electrical appliances or devices for various purposes. For example, it may be useful to have a control system for the operation of various lighting points in a public lighting network or also inside a building or an industrial area, an airport structure or the like. In this case, the electrical devices are constituted by lighting devices. A system of this type may be utilized on the one hand to send commands or instructions (for example for selective switch-on) of the various devices and on the other to collect information on the operating conditions of said devices in order to act in the event of malfunction.

BRIEF SUMMARY OF THE INVENTION

The object of the invention is to produce a method that allows reliable exchange of information between control devices associated with electrical devices and a collecting unit utilizing the power supply line of the devices via a power line carrier transmission system.

Substantially, according to a first aspect the invention relates to a communication method between a collecting unit and a plurality of control devices, each of which is associated with at least one electrical device, via a communication channel, wherein messages are exchanged between said collecting unit and said control devices, each containing:
  a progressive message number,
  a sender identification number,
  an addressee identification number,
  a portion of informative content and/or executable commands,
  a counter.

Moreover, a specific identification number is assigned to each control device and to said collecting unit, if needed so that the messages may be addressed selectively to a specific control device via the addressee identification number.

The sender identification number could even not be provided as such in the messages. It may be envisaged that the informative' content and/or executable command includes a portion (such as for example the first bit) which indicates whether the message comes from the collecting unit or from a generic control device. If this information is provided, the sender is identified univocally anyhow, since: if the sender is the collecting unit, said first bit actually indicates the sender. If the message is generated and sent by a control device, said first bit indicates that the sender is a control device and the addressee identification number indicates the addressee which actually generated the reply message. If a message is received by a device which is not the intended addressee, one or more echoes of said message are generated, under the control of a routine which prevents the generation of an unlimited or excessively high number of echoes of the same message. This can be done by providing a counter in the message, which is decreased each time the message is re-generated by means of an echo. Alternatively, the device can be programmed such as to store an information on the message of which an echo has been generated, such as the progressive number of the message. The same device will not generate a subsequent echo of the same message even if it receives an echo thereof.

With a device of this type, it is possible to envisage that when a control device receives a message containing a different addressee identification number from its own identification number it transmits an echo of the message received on the communication channel. This allows the message to be regenerated so that it finally reaches the addressee, that is the control device or collecting unit to which it is addressed, notwithstanding the distance between the emitter of the message and the addressee of the message, and therefore also when the communication channel is disturbed or when the various devices are at a great distance from one another. Various modes of generating a controlled number of echoes (or even a single echo) are disclosed herein after.

The transmission of echoes to re-generate a message in a data transmission system is known. For example U.S. Pat. No. 4,692,761 discloses a network to which a plurality of remote units are connected. Each remote unit exchanges information with a master unit. This is obtained by each remote unit transmitting a package of information data to the master unit via a selected set or chain of intermediate remote units. Each remote unit along the chain receives the message from the upstream unit and generates an echo containing the address of the downstream unit, and so on. This means that each message is addressed to one specific intermediate remote unit, which is the only one generating an echo of the message, in turn addressed to a specific further remote unit or to the master unit.

This known system is extremely complex, also in view of the fact that possible interruptions or hindrances on the selected path require re-adaptation of the chain of units which connect a remote unit to the master unit and vice-versa. A self-adaptation control software is thus required.

Differently from such known system, the invention is based on the idea that a message is either received by the control device (or remote unit) to which it is addressed and the latter generates a reply to the received message, or those control devices which receive said message generate an echo thereof. There is no need to design a specific message route from each remote unit to the master unit as required by the known system.

According to a particularly advantageous embodiment, the communication channel is constituted by a power supply line of the electrical devices with which the control devices are associated. In this case transmission occurs via power line carrier transmission on the power supply line by means of modems specifically produced for this function and known as PLM (Power Line Modem). In a configuration of this type the method according to the invention allows information to be transmitted and received even with very long power lines.

Hereinafter specific reference will be made to an application of this type, with a communication channel constituted by a power supply line with power line carrier transmission. It must, however, be understood that many innovative aspects of the present invention described hereinafter in this specific application may also be applied in systems with communication channels of different types, for example via radio waves. In this case the electrical devices may be fed by a power supply line that does not perform the function of communication channel, or also supplied by autogenous units, storage batteries or the like. The method of the present invention may also be applied in mixed or hybrid systems, where the communication channel is constituted partly by a power, supply line and partly by a different channel, for example, radio, a dedicated cable, a data transmission bus or the like.

In order to prevent a certain message from being repeated infinitely, also when for example the addressee to which it is addressed does not receive it or does not answer due to an operating failure, according to a first embodiment of the method according to the invention the message also contains a counter and with each generation of echo the counter is decreased. In this way before transmitting the echo of a message, the control device receiving a message not addressed to it checks the value of the counter and transmits the echo of the message only if the value of the counter of the message received is above a minimum pre-established value, for example above zero. The initial value to which the counter is set each time a new message is generated is advantageously equal to at least the number of control devices connected to the power line.

To prevent echoes from overlapping, according to an advantageous embodiment of the method according to the invention each control device transmits said echo of the message received with its own delay, the delays with which said control devices transmit the echo of the messages received all being in this way, in principle, different from one another. These delays may, for example, be determined on the basis of the identification number of the single control device and may be proportionate to the duration of the message.

In a different embodiment, to prevent echoes of the same message from being generated infinitely, a specific control device may store, in a circular buffer, information to identify the message whose echo it generates. The temporary memory will have room for a specific and relatively limited quantity of identifying information. The device is in this case programmed so that before it generates an echo of a message received but not addressed to it, it first checks whether it has already regenerated this message previously via an echo. This check is performed by comparing the message received with the previously stored identifying information. If the message corresponds, to stored identifying information, the device will not generate the echo. In this way once a first device has generated for example the first echo of a message, when it receives the echo of the same message generated by the subsequent control device it will not generate it a second time.

If the collecting unit emits messages addressed to specific control devices with a temporal interval above the maximum delay with which a previous message can be regenerated via echo by all the control devices connected to the line, this procedure prevents infinite repetition of the echo of a message that remains unanswered, for example due to an operating failure in the device to which it is addressed.

Advantageously, according to a possible embodiment of the method according to the invention, when a control device receives a message containing its own identification number as the addressee identification number, it transmits a reply message on said line, in which:

the sender identification number corresponds to the addressee identification number of the message received;

the addressee identification number corresponds to the sender identification number of the message received;

the progressive number is the same as the progressive number of the message received increased by a predetermined value;

and the portion of informative content and/or of command (M4) contains a reply to the message received.

If the method uses a counter whose value is decreased each time an echo is generated, the counter is reset to its maximum value in the reply message, so that this reply message may be regenerated via generation of an echo an adequate number of times. Moreover, the progressive message number of the reply is required, as shall be explained hereunder, to allow the remaining control devices to recognize when they receive a reply to a message whose echo they are generating. In this way, the echo of each message, sent by the collecting unit to a specific control device, generated by the remaining control devices can cease as soon as a reply has been given for it.

The messages structured as defined above are addressed to specific devices. That is, the collecting unit may address information, commands or requests for information to one or more devices selectively and if necessary sequentially. This may be useful for example each time it is necessary to check the correct operating conditions of one or more electrical devices with which the control devices are interfaced, or to individually switch on, switch off or regulate one or more electrical devices.

However, the method according to the invention may be further improved by making it possible to send, via the collecting unit, messages. Addressed in general to all the control devices or to all the electrical devices interfaced therewith. The messages not selectively addressed but directed in general to all the control devices will hereinafter be defined as broadcast messages. These general messages do not require a reply and in any case are not characterized by a specific addressee identification number. Any device receiving them must consider them as sent to it, although it is also advisable to make it possible for these messages to be regenerated via echo, to overcome the problem of losses on the line and hence reach even very remote control devices.

For this purpose, the broadcast messages are advantageously characterized by a counter and each device that receives them, in addition to reading the content of the message and replying if necessary to the instructions of commands contained in it, emits an echo of the message, decreasing the counter. In this way, in substance, unlike messages addressed to a specific control device, which are either read and executed or regenerated via echo, broadcast messages are both read and executed if necessary, and regenerated via echo by any device that receives them. The counter and the decrease in the value of the counter with each generation of the echo is required in this case to prevent the various broadcast messages from being regenerated infinitely.

Broadcast messages may be used, for example, to send the current time to each control device, or to send commands to be executed without distinction. In the case of lighting systems, a broadcast message addressed to the various control devices associated with the various lighting devices may be utilized to command simultaneous switch-on of the various lighting devices, or to reduce the light emission.

According to a particularly advantageous embodiment of the invention, the method includes an initial accrediting phase of the control devices by the collecting unit, during which said collecting unit assigns each control device its own identification number.

According to another aspect, the present invention relates to a system to implement the aforesaid method. The characteristics of the system and its components, and further characteristics and advantageous embodiments of the method according to the invention are indicated in the attached claims and shall be described in greater detail hereunder with reference to a nonrestrictive embodiment of the invention.

BRIEF DESCRIPTION OF THE SEVERAL VIEWS OF THE DRAWINGS

The invention shall now be better understood by following the description and attached drawing, which shows a non-restrictive practical embodiment of the invention. In greater detail, in the drawing:

FIG. 1 shows a block diagram of a system according to the invention;

FIG. 2 shows a block diagram of the control device;

FIG. 3 shows a schematic representation of the message exchanged between the collecting unit and the control devices;

FIG. 9 shows a block diagram of a different system in which the method according to the invention may be applied;

FIG. 10 shows a different format of the digital message exchanged between collecting unit and control devices.

DETAILED DESCRIPTION OF THE INVENTION

Figure 4:
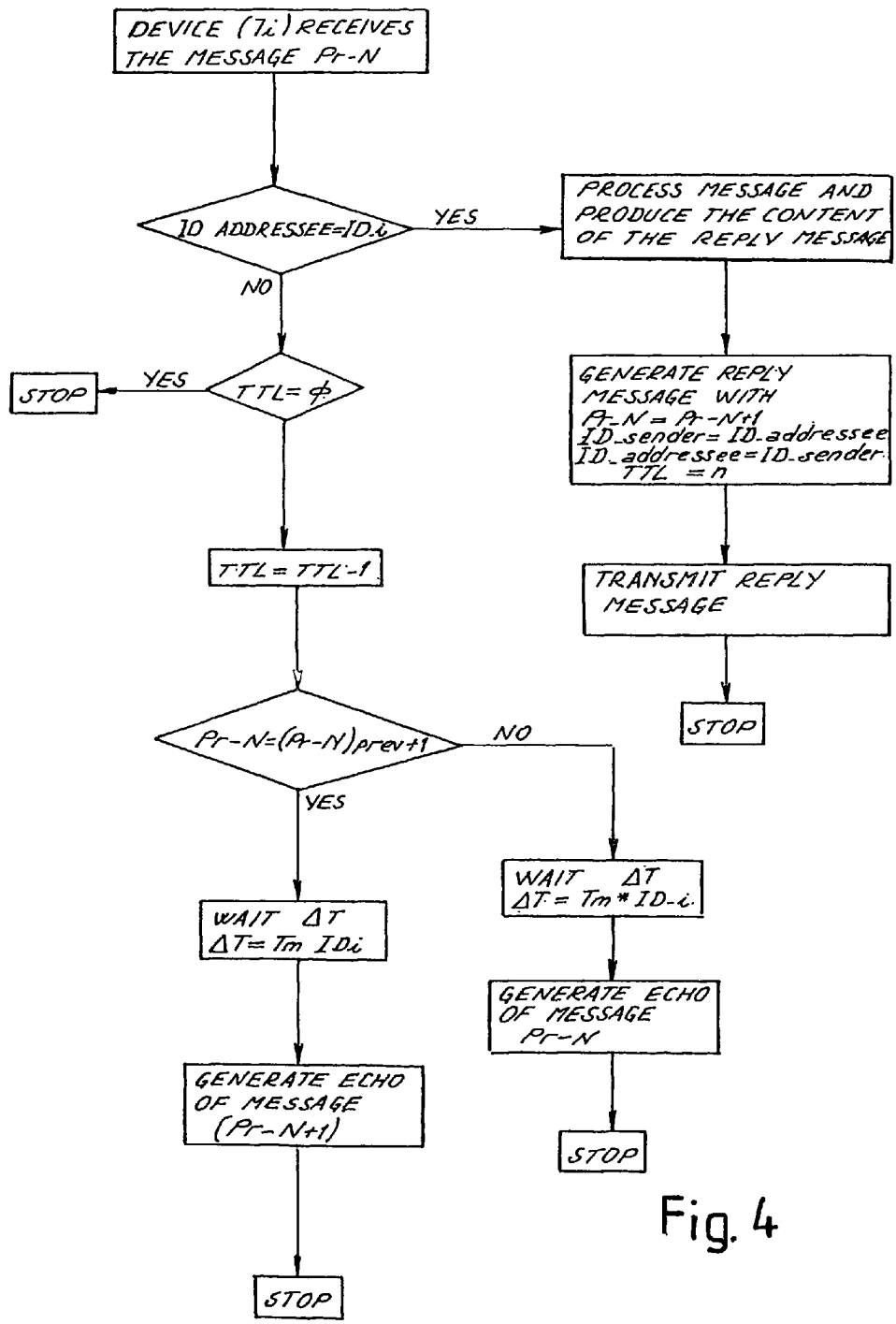
FIG. 4 shows a summarizing flow diagram of the operation of a generic control device for the management of messages addressed selectively to a control device of the system.

FIG. 1 shows a system comprising a plurality of generic electrical appliances or devices $1_1, 1_2, 1_3, \ldots 1_j, \ldots 1_n$ connected to a supply line 3, comprising phase (L) and neutral (N). The system may comprise any number of devices $1_j$, which may be equal or similar to one another, or even entirely different. For example, each device 1, may be constituted by a lighting device, or by any other electrical appliance that must exchange information with a collecting unit schematically shown at 5 and connected to the supply line 3.

A respective control device $7_1, 7_2, \ldots 7_n$ is associated with each electrical device $1_1, 1_2 \ldots 1_n$ Schematically, each control device $7_i$ comprises (FIG. 2) a microprocessor 9, a memory 11 and a modem 12 for transmitting and receiving data via power line carrier transmission on the power supply line 3. These modems are per se known and commonly called power line modems (PLM). Examples of PLMs that may be used are for example TDA50051 or TDA5051A manufactured by Philips or the devices ST7537 or ST7537HS1 manufactured by ST Microelectronics.

Each control device $7_i$ is interfaced with the corresponding electrical device $1_i$ and may receive information from or supply information to it. Information is intended as any organized series of data. that may represent instructions or commands to execute and/or actual informative data, for example data relative to the operating conditions of the electrical device.

The collecting unit 5 comprises, analogously to the various control devices $7_i$, a PLM shown at 14 interfaced with a microprocessor 15 with a memory 17. The number 19 indicates a transmission device between the collecting unit 5 and—for example—a central control. This transmission device may be of any type, for example based on GSM technology.

With the PLM they have at their disposal, the control devices $7_i$ and the collecting unit 5 may exchange information reciprocally to allow on the one hand the collecting unit 5 to learn data relative to the operating conditions of each electrical device $1_j$, and on the other each electrical device to receive commands, instructions or data from the collecting unit.

There are some difficulties in the transmission of information from and to the collecting unit 5 along the power supply line 3 that supplies the various devices of which the system is composed. In the first place each control device $7_i$ must be able to recognize when a specific message containing information is addressed to it and when, instead, it is addressed to a different control device $7_i$. In the second place each collecting unit 5 must be able to discern which device $7_i$ emits a specific message it receives from the power line 3. Moreover, the messages from and to the collecting unit must be able to reach any device $7_i$ associated with any electrical appliance or device wherever it is positioned along the line 3. This means that the system must be able to obviate the attenuation to which the message transmitted along the power line necessarily undergoes due to inevitable losses along this line. These problems are tackled and solved in the manner described hereunder.

Transmission of Messages-Addressed to Specific Control Devices.

The messages that are exchanged between the collecting unit 5 and the various control devices $7_i$; are constituted by packets of bits that have a structure schematically represented in FIG. 3. This shows a packet of bits forming a single message. This packet is divided into a series of segments or portions of message as follows:

first portion, indicated with M1, contains a progressive message number, indicated with Pr_N;

a second portion, indicated with M2, contains an identification number of the sender of the message, indicated with ID_sender. Univocal identification numbers are associated with each control device 7, and the collecting unit 5, so that each message may contain an indication (the ID_sender number) allowing univocal identification of the appliance that generated and transmitted it;

third portion, indicated with M3, contains an identification number of the addressee of the message, indicated with ID_addressee. Just as the sender identification number allows identification of the emitter of the message, the addressee identification number allows univocal identification of the addressee of each message;

a fourth section, indicated with M4, of appropriate length, is required to contain the information associated with each message;

A fifth section, indicated with M5, contains a counter, which hereinafter will be indicated with the initials TTL (TTL=Time to Live), the meaning of which will be explained later. Briefly, it represents the number of times the message may be regenerated via an echo;

a sixth section, indicated with M6, contains a control field that is required, in a per se known way, to check the integrity of the message.

This is indicated with CRC.

Let us now presume that the collecting unit 5 must perform an interrogation cycle to check if all the electrical devices $1_1$, $1_2$, ... $1_i$, ... $1_n$ are operating correctly. For this purpose: the collecting unit 5 will send on the line 3 a number of interrogation messages equal to the number (known in advance and acquired by the collecting unit 5 in the way to be described hereunder) of devices 1. All these messages will be characterized by the same ID_sender (with ID_sender=ID_unit_5) and each will be characterized by its own addressee identification number, ID_addressee. Hereinafter, ID-i will indicated the generic address of the addressee $i^{th}$ to which the message is addressed, that is for which it is destined.

As all the messages are sent on the same line 3, each control device $7_1, 7_2, 7_3, \ldots 7_i \ldots 7_n$ will receive all the messages and must only process those addressed to it.

For this purpose, each time a generic device $7_i$ receives a generic message Pr_N=k (with k=1, 2, 3 n, n being the total number of devices 7 and hence of messages generated and transmitted by the collecting unit 5), the first operation it performs is a check to ascertain if ID_addressee=ID_i that is if the message is addressed to it. If so, it will process the message, otherwise it will proceed as follows:

it will check the value of the TTL counter. If this is equal to zero it will stop processing. If the TTL value is above zero, it will decrease the value of the TTL counter by one unit and it will generate an echo of the message received, with the new TTL value in the section M5 of the message, transmitting this echo on the line 3.

As each device $7_1$-$7_n$ receives the message and all but one generate an echo, in order to prevent overlapping of the messages on the line 3 each echo is generated and transmitted with a delay specific to the device that transmits it. For this purpose, each device transmits the echo with a delay equal to the duration of the message (indicated with Tm) multiplied by the identification number (ID_i) of the device.

The initial value of the TTL counter is set to the total number (n) of control devices 7 that are connected to the line 3 and that must dialog with the collecting unit 5. Therefore, each message will be regenerated, that is an echo of it will be reproduced, only for a limited number of times, at the most equal to n. If the device $7_i$ to which the message is addressed does not receive it or in any case does not react correctly to this message (that is, does not transmit a reply), generation and transmission of the echo will stop after a certain number of repetitions. If it does not receive a reply to its message, the collecting unit 5 will report a fault in the device $7_i$, to which the unanswered message was addressed.

Generation of the echo is aimed at regenerating the message to overcome losses along the transmission line 3. With this arrangement, even if the device to which the message is addressed is at a great distance from the collecting unit 3, it will in any case receive a regenerated and hence perfectly decodable message.

If the device is the device $7_i$, to which the message is addressed, that is if ID_addressee=ID_i, the device processes the message. This processing is determined by the content of the message. For example, if the message is a request for information on the operating status of the electrical device $1i$ associated with the control device $7_i$, the microprocessor 9 of the device $7_i$ will send, again with a message having the structure in FIG. 3, the collecting unit 5 the information requested on the operating status of the electrical device $1_i$.

For this purpose the message generated and transmitted on the line 3 by the control device $7_i$ is characterized by:

a progressive message number equal to the number of the interrogation message increased by 1, that is Pr_N= $(Pr\_N)_{prev}$+1, where $(Pr\_N)_{prev}$ is the progressive number of the interrogation message;

addressee identification and sender identification exchanged in relation to the original interrogation message (that is ID_addressee=ID_sender; ID_sender=ID_addressee);

a TTL counter value equal to the initial value (TTL=n);

a message content (in the portion M4 of the message) with the information requested in the interrogation message.

The reply message is received by all the control devices $7_i$ excluding the one that sent it, as well as by the collecting unit 5.

As was indicated hereinbefore, each control device that receives a message not addressed to it transmits (with a certain delay) an echo. The echo is no longer necessary when the control device, to which the message is addressed, has received it and has emitted a reply message. Therefore, each control device is also programmed to stop generating the echo of the interrogation message as soon as it receives a reply message. Any message received from any control device $7_i$ is recognized as a reply message to a previous interrogation message when the progressive number Pr_N of the reply message is the same as the progressive number of the interrogation message increased by one unit. In other words, when a control device receives two messages with adjacent progressive numbers Pr_N, it is able to recognize that the first of the two has received a reply.

When the different generic control device $7_i$ to the one to which the interrogation message is addressed receives the reply message, it automatically stops generating the, echo of the interrogation message (message Pr_N) and starts to generate the echo of the reply message (message Pr_N+1).

In this way the reply message is regenerated and may be received by the collecting unit 5 even if it is at a great distance from the control device 7 that transmitted the reply to the interrogation message. Also in the case of transmission of the echo of the reply message, each control device transmits this echo with a delay equal to the duration Tm of the message multiplied by its own identification number ID_i. Moreover, also in generation and transmission of the echo of the reply message, the value of the TTL counter is controlled and decreased by one unit with each echo transmission. As the TTL counter has been set to "n" by the control device that transmitted the reply message, this reply message will also be regenerated via echo for a maximum number of times equal to "n".

The entire procedure described hereinbefore is summarized in the flow diagram in FIG. 4. In the flow diagram $(Pr\_N)_{prev}$ indicates the progressive number—stored by the device—of the message immediately prior to the current one (characterized by the progressive number Pr_N).

The collecting unit 5 is programmed so as to generate an interrogation message and wait for the respective reply message. As has been seen, the two messages (interrogation and reply) are characterized by two sequential progressive numbers. For example, a reply message with Pr_N=j+1 corresponds to the interrogation message Pr_N=i. Once the collecting unit 5 has received the reply message (with the progressive number Pr_N=j+1) it can generate and transmit the subsequent interrogation message (message with the sequential or progressive number Pr_N=j+2), This new interrogation message is received by all the control devices $7_i$. These, with exactly the same procedure described above with reference to the previous pair of interrogation and reply messages, recognizing the message with progressive number Pr_N=j+2 as a reply to the message with progressive number Pr_N=j+1, stop generating and transmitting the echo of the message Pr_N=j+1 and start generating and transmitting the echo of the message PR_N=j+2.

Therefore, in general each control device excluding the one to which a certain message is addressed, sees two messages with consecutive progressive numbers as interrogation and reply message respectively.

With the procedure illustrated the collecting unit 5 can communicate with anyone of the control devices $7_i$ and send it selective commands, selective. requests for information or, any other message. In the same way, any control device can reply to interrogation by the collecting unit or even send an autonomous message, that is generated and transmitted by this device autonomously and not in reply to an interrogation message. Typically, an interrogation message may consist— as mentioned—of the request by the collecting unit 5 to check the operating conditions of the individual electrical devices $1_i$ associated with the various control devices $7_i$. A command message, on the other hand, may be a message in which the information consists of a command to switch on, switch off or regulate the electrical device $1i$ associated with the control device $7_i$ to which the message is addressed.

In the case of a lighting system, in which the devices $1_i$ are constituted by lighting devices, the message coming from the collecting unit may, for example, be a switch-on command. In this particular case, the various electrical devices (or more precisely, the control devices 7 associated with it) may be programmed so that they are switched on or off at a predetermined time (if necessary different from device to device). In this case switch-on and switch-off are controlled simply by sending, via the collecting unit 5, messages containing the current time. Switching on of the various devices that are programmed to switch on or off simultaneously will take place in a synchronized way, irrespective of correct synchronization of the clocks of each microprocessor 9, as the time is transmitted directly by the collecting unit 5.

The collecting unit 5, therefore, does not behave only and exclusively as a unit that collects data or information coming from the single devices of which the system is composed. It may also function as a central control to send commands to be executed. Therefore, a collecting unit must be intended generically as a central control unit for the collection and/or transmission of data, information, instructions, commands, etc.

The method described hereinbefore is based on the idea of generating the echo of a message by each control device excluding the device to which the message is addressed, preventing infinite repetition of a specific message via the use of a counter that is decreased with each echo generated.

Figure 7:
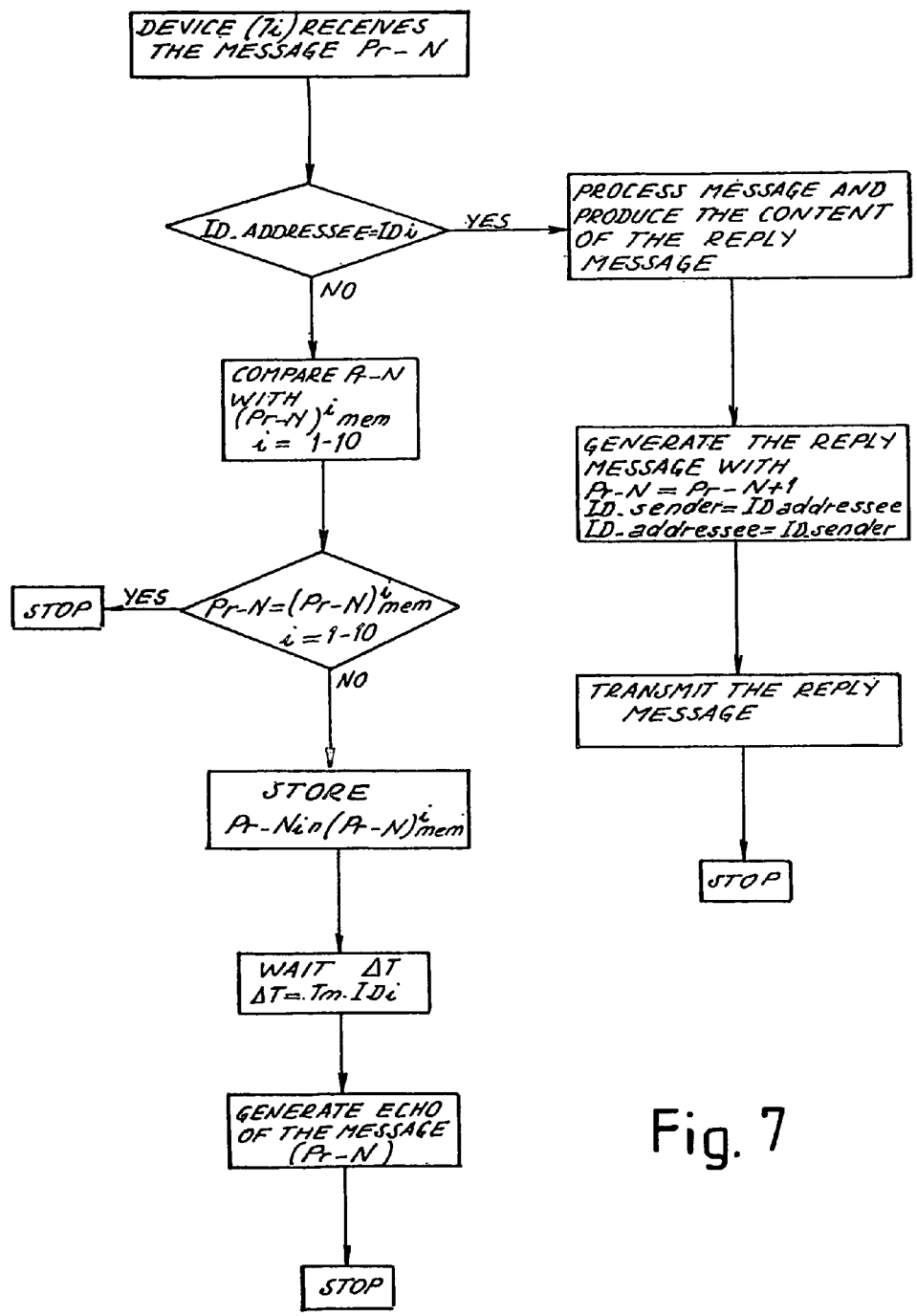
FIG. 7 shows a flow diagram analogous to the diagram in FIG. 4 in a different embodiment.

In an alternative method for regenerating the message via subsequent echoes by control devices excluding those to which the message is addressed, each control device generates a single echo of each message received and addressed to a different control device $7_i$. This different method will be illustrated with reference to the flow diagram in FIG. 7.

The generic device $7_i$, receives a message with a progressive message number Pr_N and characterized by specific addressee identification (ID_addressee). If ID_addressee=ID_i, that is if the message is addressed to the device in question, it processes the message and produces the content of the reply message increasing the progressive message number by one unit and exchanging the sender identification for the addressee identification. If requested, it places the reply to the message in the field M4. The reply message is transmitted by putting it on the line 3.

If the message identification number indicates to the device $7_i$ that the message is addressed to another addressee, it performs the routine to check whether the echo must be generated. For this purpose, the progressive message number is compared with a certain quantity j of previous message identification numbers corresponding to messages of which the device in question has emitted the echo. In the flow diagram in FIG. 7 the total of these identification numbers is indicated, with (Pr_N)/mem, where j is the quantity of identification numbers stored, in the example j=1, 2 . . . 10. If the progressive message number Pr_N received is different from all those stored, the device generates an echo after a delay calculated with the same procedure described hereinbefore for the previous example of embodiment.

The progressive message number is Pr_N is stored.

On the other hand, if the progressive message number Pr_N is the same as one of the stored values, this means that the control device in question has already emitted an echo of the message in question and does not generate a second echo.

The progressive message numbers of which the device $7_i$ generates the echo are stored temporarily in a circular buffer or of the FIFO type. If (as exemplified in this case) ten progressive numbers can be stored in the memory, when the device generates the echo of an eleventh message, it stores the respective progressive number, deleting from the memory the oldest of the stored progressive numbers.

If the collecting unit puts messages on the line 3 addressed to various control devices 7 spaced by a sufficiently long time, above the maximum delay with which the control devices generate the echo, this avoids infinite repetition of messages which have not received a reply.

Figure 11:
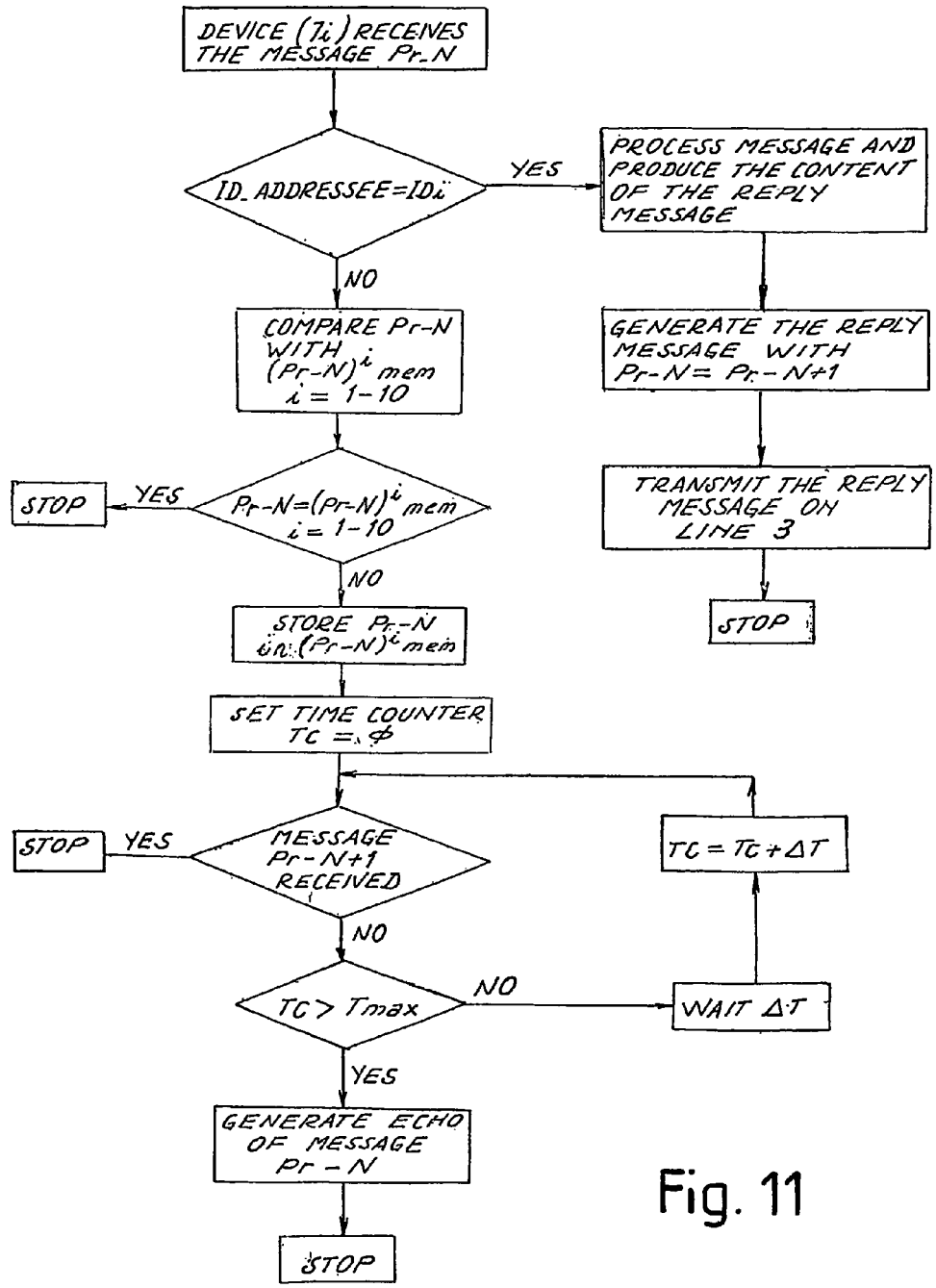
FIGS. 11 and 12 show block diagrams explaining the operation mode in a different embodiment.
Figure 12:
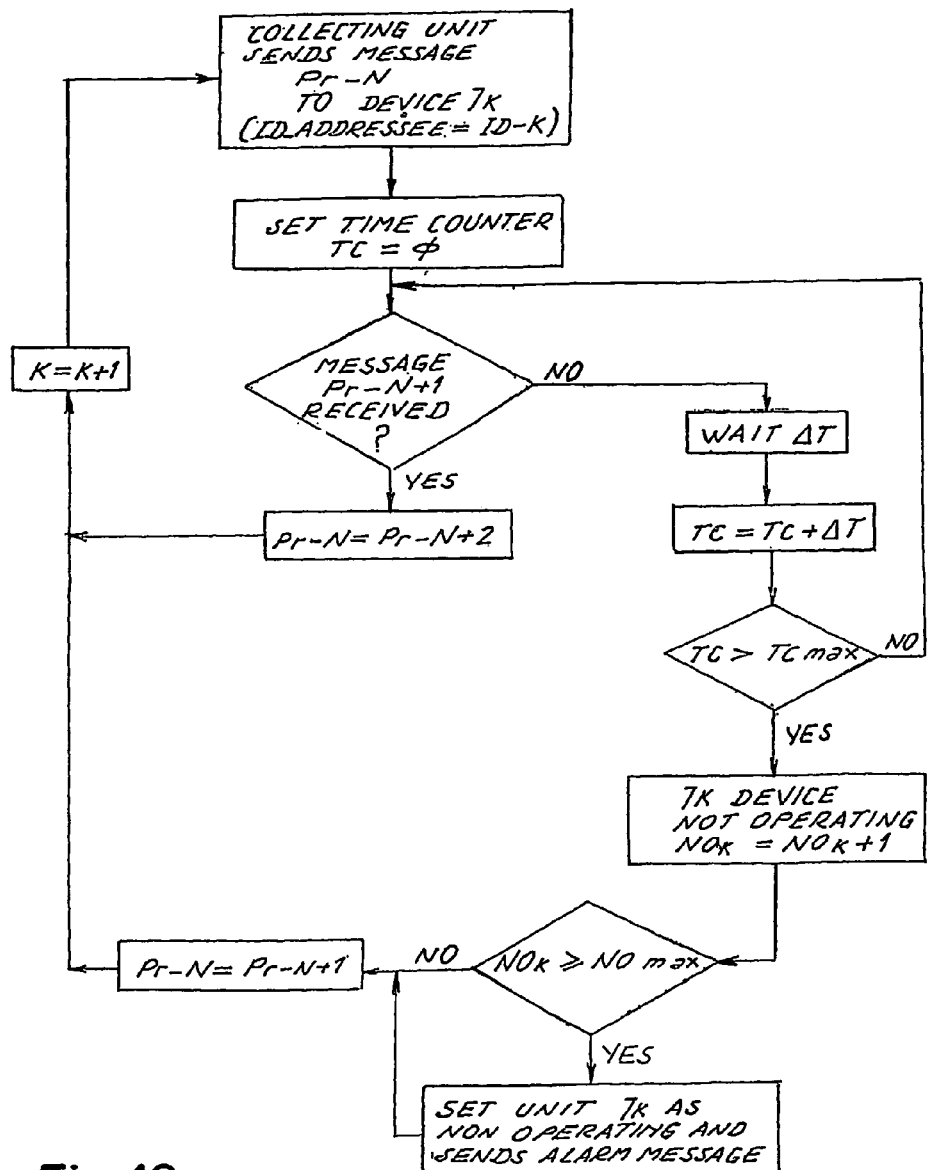

FIGS. 10 to 12 show block diagrams explaining a further embodiment of the invention. In FIG. 10 a different structure of the digital signal, i.e. of the packet of data forming the message exchanged between the collecting unit and the control devices is shown. This packet is divided into a series of segments or portions of message as follows:

a first portion, indicated with M1, contains a progressive message number, indicated with Pr_N;

a second portion, indicated with M3, contains an identification number of the addressee of the message, indicated with ID_addressee as in the embodiment of FIG. 3. The addressee identification number allows univocal identification of the addressee of each message. As will be explained later on, once a message addressed to a control device identified by the ID_addressee has been generated, the identification number is not changed in the reply message, generated by the control device and addressed to the collecting unit;

an optional section M3 containing the serial number of the control device to which the message is addressed. As will be explained later on the serial number of the device is assigned to it during manufacturing and in an accrediting phase the collecting unit may associate to each serial number (Ser_N) an identification number ID_I;

a third section, indicated with M4, of appropriate length, is required to contain the information associated with each message.

The first section of this portion, e.g. the first bit thereof, can assume two different values, depending on whether the message has been generated by the collecting unit or by one of the control devices;

a fourth section, indicated with M6, contains a control field that is required, in a per se known way, to check the integrity of the message.

This is indicated with CRC as in FIG. 3.

The procedure is as follow. Let us assume that the collecting unit 5 must perform an interrogation cycle to check if all the electrical devices $1_1, 1_2, \ldots 1_i, \ldots 1_n$ are operating correctly. For this purpose, the collecting unit will send on the line 3 a sequence of interrogation messages equal to the number of devices 1. Each message will be characterized by its own addressee identification number, to_addressee. Hereinafter, ID_k will indicated the generic address of the addressee k-$^{th}$ to which the message is addressed. The collecting unit 5 can be programmed such as to generate an individual message and to wait until it receives a reply to the previous one before sending the subsequent message.

As all the messages are sent on the same line 3, each control device $7_1, 7_2, 7_3, \ldots 7_i \ldots 7_n$ may in principle receive all the messages and must only process that addressed to it.

For this purpose, each time a generic device $7_j$ receives a generic message PCN=x (with x=1, 2, 3 . . . n, n being as defined, above), it checks whether the message is addressed to it. If so, it will process the message, i.e, if the message is addressed to the device in, question, it will generate a reply message which will have a progressive message number increased by one and, if required, containing a reply in the field or message portion M4. If for example the message sent by the collecting unit 5 is an interrogation as to the status of the electric device 1k, the reply may be a message containing data confirming that the device is operating properly, or data containing information as to the operation parameters of the device.

The reply message is transmitted by putting it on the line 3. The first bit of the M4 field is changed so as to indicate that the reply message comes from a control device 7 rather than from the collecting unit 5. Since the ID_addressee is not changed, the combination of the first bit of the M4 field along with the ID_addressee in field M3 actually gives an information corresponding to the ID_sender disclosed with reference to the previous embodiment.

If the control device $7_i$ receiving the message is not the k-$^{th}$ device to which the message is actually addressed, the control device $7_i$, performs a routine to check whether the echo must be generated. For this purpose, the progressive message number is compared with a certain number "j" of previous message identification numbers corresponding to messages of which the device in question has emitted the echo. In the flow diagram in FIG. 11 the total of these stored identification numbers is indicated with (Pr_N)/mem, where j is the quantity of identification numbers stored, in the example j=1, 2 . . . 10. If the progressive message number Pr_N received is different from all those stored, the device generates an echo after a delay calculated with the same procedure described hereinbefore for the previous embodiments. The delay with which the generic device (7k) generates and transmits the echo on line 3 is preferably set such as to be always longer than the maximum time required by the device ($7_k$) to which the message is addressed to generate a reply message. This allows the echo-generating routine to be interrupted if a reply message is actually generated and received by the device 7j during the delay interval. The device $7_i$ recognizes the reply message in that its progressive number is equal to $$Pr\_N+1$$

i.e. equal to the progressive number of the message the echo of which is in the process of being generated, increased by one.

If during the delay interval (the maximum duration of which is indicated as TCmax in the flowchart of FIG. 11) no reply message is received, the echo is eventually generated and transmitted and the progressive message number Pr_N is stored in the FI-FO memory of device $7_i$. This ensures that if an echo of the same message is generated by a different device (say the control device $7_j$ for example) and is received by the $7_i$ device, the latter does not generate a further echo anymore. In other words, if the progressive message number Pr_N is the same as one of the stored values, this means that the control device in question has already generated an echo of the message in question and does not generate a second echo. If (as exemplified in this case) ten progressive numbers can be stored in the memory, when the device generates the echo of an eleventh message, it stores the respective progressive number, deleting from the memory the oldest of the stored progressive numbers.

As stated above, in this embodiment the collecting unit generates a subsequent interrogation message addressed to a different device 7 only after
 the reply message to the previous interrogation message has been received, or
 a predetermined maximum time (TCmax) has elapsed since the previous interrogation message has been transmitted, without a reply message being received (timeout)

as summarized in the flow-chart in FIG. 12. This avoids unlimited repetition of echoes, even of those messages which do not receive a reply, say because the control devices 7 to which they are addressed are shut down or because they cannot be reached due to an interruption on the transmission line, or else because the devices actually receive the interrogation message but the reply is unable to reach the collecting unit for whatever reason.

Should an interrogation message from the collecting unit 5 to the k-$^{th}$ control device not receive an answer within the prescribed maximum time limit, the collecting unit 5 sets the interrogated k-$^{th}$ control device $7_k$ as non-operative and may send an alarm message to an operation centre. In the case of an illumination system, if a lamp of a lighting network is broken, the corresponding control device 7 will not reply to the interrogation message and the collecting unit 5 will generate a corresponding alarm message will prompt a maintenance intervention. The next interrogation message to a different control device 7 (in the flow-chart of FIG. 12 device k 7(k+1) will then be generated and transmitted and will have a progressive number Pr_N incremented by 1 with respect to the previous interrogation message, remained unanswered (i.e. the collecting unit will set Pr_N=Pr_N+1).

Actually, as indicated in the flow-chart of FIG. 12, the alarm message sent by the collecting unit 5 to an operation center or a central unit is generated only if the given control device $7_k$ fails to reply to an interrogation messages for more than a pre-set number of consecutive interrogation messages, i.e. after a pre-set number of interrogation cycles. This pre-set number is indicated as $NO_{max}$ in the flow chart of FIG. 12. A counter ($NO_k$) is provided for a given k-$^{th}$ control device $7_k$. Said counter is incremented each time an interrogation message to the control device $7_k$ is not answered to.

Only upon reaching such maximum number of unanswered messages is an alarm message, i.e. a warning message, issued. The control device involved is set as non-operating by the collecting unit. This means that the collecting unit will not send messages to said control device until maintenance intervention.

The maximum time $TC_{max}$ can be a constant value. According to an advantageous embodiment, however, said maximum time $TC_{max}$ can be variable and can be set at a different value for each control device 7. The procedure to set the $TC_{max}$ value for a given control device $7_k$ can be as follows. A first time interval $TC_{max}$ is set. If the control device $7_k$ answers to a message in a time shorter than $TC_{max}$, the time interval $TC_{max}$ for the next interrogation message addressed to the same control device $7k$ will be shortened.

On the other hand, if the collecting unit 5 does not receive an answer from the control device $7k$ within the current value of the time out interval $TC_{max}$, such time interval can be increased at the next interrogation cycle. If the control device $7_k$ did not answer to the previous message, this might indeed be due to the fact that the number of echoes required to reach the control device 7 and to send back an answer to the collecting unit 5 requires a time which is longer than the pre-set $TC_{max}$ time interval. In such case the collecting unit 5 would not receive an answer even though the control device $7_k$ is actually properly operating. The subsequent interrogation cycle will allow more time for the $7_k$ control device to reply. Only if after $NO_{max}$ subsequent interrogation cycles and using increasing $TC_{max}$ values the answer is not received, the alarm signal is sent to the central unit.

This procedure reduces the overall time required for a full interrogation cycle, i.e. the time required by the collecting unit 5 to send a 5 message to each control device 7 and to receive an answer therefrom.

The various control devices different from that to which said new interrogation message Pr_N+1 is addressed will interpret the new message as a reply to the previous one, and this will prevent further generations of echoes of the previous Pr_N message. Echoes of the Pr_N+1 message will be generated following the above described routine.

Management of Broadcast Messages

As mentioned hereinbefore, the system may be able to transmit a broadcast message from the collecting unit 5 to the various control devices $7_i$ that is, not addressed to a single device, but destined for all the devices connected to the line 3. For this purpose, each device must receive and interpret the message, if necessary executing the command contained in it, and at the same time generate an echo of the message, so that all the devices receive it, without the echo of one broadcast message remaining infinitely on the power supply line 3.

Figure 8:
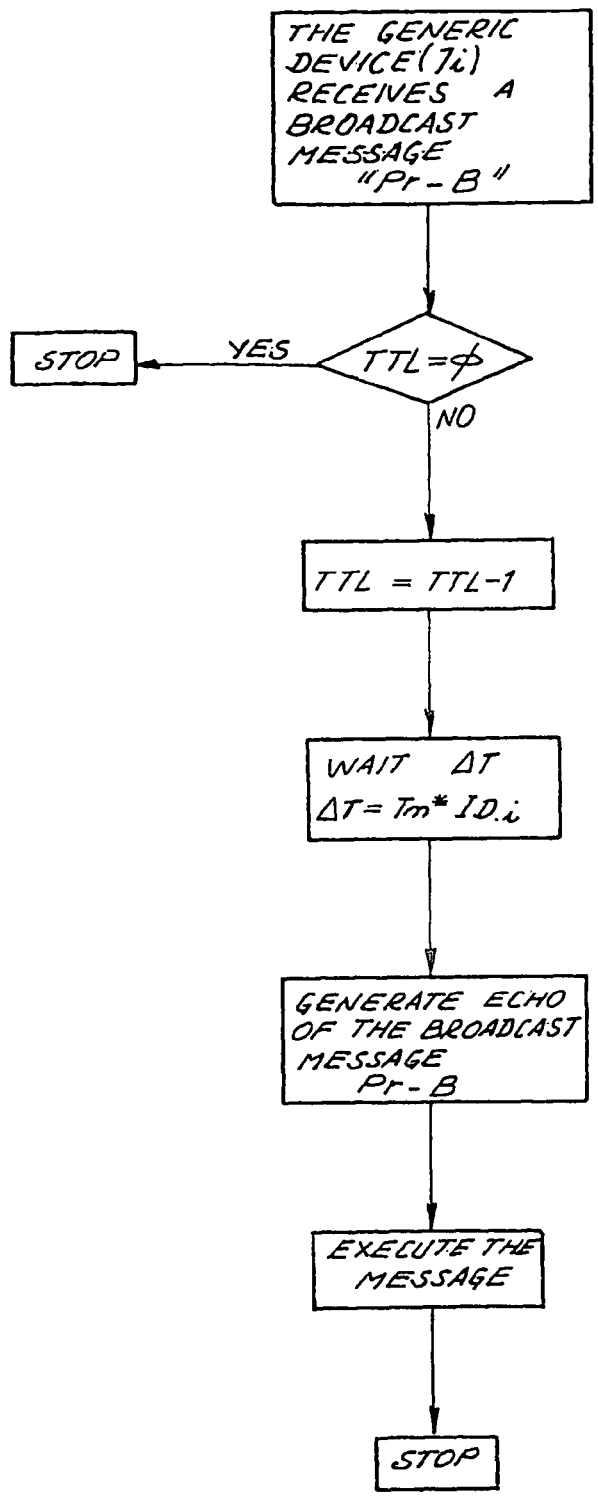
FIG. 8 shows a flow diagram relative to the management of broadcast messages.

The procedure implemented for this purpose shall now be described with reference to the flow diagram in FIG. 8. The generic device $7_i$ receives a broadcast message. This is characterized by a different message identification number than any progressive message number of a generic message addressed to a specific device. This identification number is indicated with Pr_B. It may for example be a fixed value above the value that Pr_N may take.

The generic device $7_i$ is able to recognize the broadcast message from the value of Pr_B, that is the value contained in the field M1. The structure of the message may be identical to the one in FIG. 3, where data without meaning and that are not used are provided in the fields M2 and M3.

When the control device recognizes the message as a broadcast message, it reads the TTL value. If the counter is above zero, the device decreases the counter and generates an echo of the broadcast message with a delay calculated in the example illustrated with the same methods described for the message with selective address. The device then executes the message. The message may also be executed before the routine to generate the echo or in parallel to it. Execution of the message may require any kind of operation, even simply reading and acquiring the information contained in the message. More generally it will entail executing a command sent by the collecting unit to all the control devices.

It must be observed that the method implemented to manage broadcast messages is very similar to the one implemented to manage messages with a specific address described with reference to the diagram in FIG. 4. If the system is programmed to manage messages with a specific address according to the diagram in FIG. 7, the broadcast messages addressed to all the control devices are managed in a substantially different way from the messages with a specific address. In fact, the broadcast messages cannot give rise to memorization of the progressive number contained in the section M1 of the message in the temporary memory of each control device. This is due to the fact that, as all broadcast messages are characterized by the same value (Pr_B) in the field M1, a generic device would never emit the echo of a second broadcast message. This makes it necessary to use a method to generate the echo based on the use of the counter TTL.

Controlling Access to the Transmission Channel

The messages are transmitted by the collecting unit 5 and by the control devices $7_i$ on the supply line 3, therefore on a single transmission channel. Access to this channel must be regulated, in order to avoid conflicts in transmission. For this purpose, two situations may be distinguished.

When the generic control device $i\text{-}^{th}$ receives a message with a specific address destined for it (that is with addressee identification equal to ID_i), it attempts to transmit the reply immediately. The modem 13 is able, in a way known per se, to detect whether a modulation is already present on the line 3 that is if the transmission of another message is in progress. This circumstance. is communicated to the microprocessor 9, which suspends the message transmission procedure and repeats it after an interval of time, which may be calculated with the procedure described hereinbefore, or by generating a casual delay. The transmission attempts are repeated until transmission is successful. If the channel is free the transmission takes place without a delay.

In the case of transmission of an echo on the line 3, the procedure is identical to the one above, except for the fact that the first transmission attempt also takes place with a delay, calculated as described hereinbefore.

Accrediting Phase

The procedure described hereinbefore presumes that the collecting unit knows the total number of control devices $7_i$ of the system. Moreover, it must be presumed that both the collecting unit 5 and each control device T, know the identification number ID-I assigned to each control device $7_i$. This condition may be attained for example by programming the collecting unit 5 and all the control devices $7_i$ during installation. Nonetheless, the procedure to assign identification numbers to the various control devices 7 by the unit 5 may be automatic. In a possible embodiment, the identification number of the devices 7 may be represented by the serial number of the device, assigned thereto during manufacturing, or else said serial number may be used in combination with an identification number which the collecting unit assigns to each control device starting from the serial number thereof. This can be done with the following procedure.

For this purpose, there may be an initial phase, hereinafter called accrediting phase, wherein the collecting unit 5, simply by knowing the total number "n" of control devices $7_1$, $7_2$, ... $7_n$ connected to the system, is able to assign a specific identification number ID_i to each of them.

The accrediting phase starts when all the control devices $7_i$ and the collecting unit 5 have been connected to the power supply line 3 and after the collecting unit 5 has been supplied with the number "n" of devices $7_i$ connected as the only input datum. Each control device $7_i$ is characterized by a specific random serial number, hereinafter indicated with Ser_N(i) for the $i^{th}$ control device $7_i$.

In the accrediting phase the collecting unit 5 sends an "accrediting request" message on the line 3, which will have a suitable format, for example the same format as the message in FIG. 3, where the section M4 contains the accrediting request and the section M3 contains a generic value, that is not correlated to a specific addressee.

As soon as a generic control device $7_i$ receives an accrediting request message, it generates a random number N_RND and calculates a temporal delay $$\Delta T = N\_RNO * Tm$$

where Tm is the duration of the accrediting request message. It then transmits its reply to the accrediting request on the power supply line. This reply contains the serial number Ser_N(i) of the device. As each control device $7_i$ transmits its reply with a random delay, the reply messages will normally all be emitted at different times and the collecting unit 5 will receive the reply messages at temporal intervals determined by the random numbers generated by each device 7. It is programmed to receive only the first reply message and ignore all the others during subsequent processing. In practice, therefore, the accrediting request message is a message of the type "the fastest reply".

After receiving the reply message to the accrediting request by the fastest of the control devices $7_i$ (that is by the one that generated the lowest N_RNO), the collecting unit 5 associates a sequential identification number 10__1 with the Ser_N of this device. In its memory it stores the various identification numbers associated with the relative Ser_N of the various control devices that during this accrediting procedure respond to the subsequent accrediting requests by the unit 5. This unit then sends an accredited confirmation message in FIG. 3, in which ID_addressee=Ser_N(i) and in which the control device $i^{th}$ is informed in the content of the message that its identification number is ID_i.

The device $i^{th}$ that receives the confirmation message changes its status that it:

no longer replies to subsequent accrediting requests; and
transmit the echo of subsequent accrediting requests, with substantially analogous methods to those described previously with reference to the normal communication messages between the collecting unit 5 and the control devices $7_i$.

In this way as the control devices receive their identification number ID_i they are excluded from the accrediting phase but start to regenerate the subsequent accrediting requests and respective replies, via an echo of the message, so that these accrediting requests and the relative replies may also reach the most remote devices from the collecting unit 5.

As the format of accrediting request and reply to accrediting request messages is the same as FIG. 3, here too the counter TTL will prevent infinite 15 repetition of a message and the progressive number Pr_N will allow each control device to stop generating and transmitting the echo of an accrediting request message as soon as this message receives a reply.

The accrediting phase stops when the collecting unit 5 has emitted "n" accrediting request messages and has received "n" replies. At this point, in fact, each control device $7_i$, has been assigned with its respective identification number ID-I and the collecting unit 5 has stored for each of the "n" identification numbers ID_I a corresponding and univocal serial number Ser_N.

Each control device $7_i$ has a memory, for example an EEPROM, in which a code is stored indicating whether or not the device has been accredited. Moreover, the accrediting request message emitted by the collecting unit 5 is characterized by a content in the field M5 that allows the device to recognize this message as an accrediting request message and thus distinguish it from other types of message.

If subsequent to an accrediting request message, two control devices not yet accredited (that is, to which the respective identification number ID_I has not yet been assigned) generate the same random number N_RND and this number is the lowest of all the numbers generated in that cycle, the two reply messages will be cancelled and the collecting unit will receive as the first reply message the one coming from the third fastest of the control devices $7_i$ not yet accredited.

Figure 5:
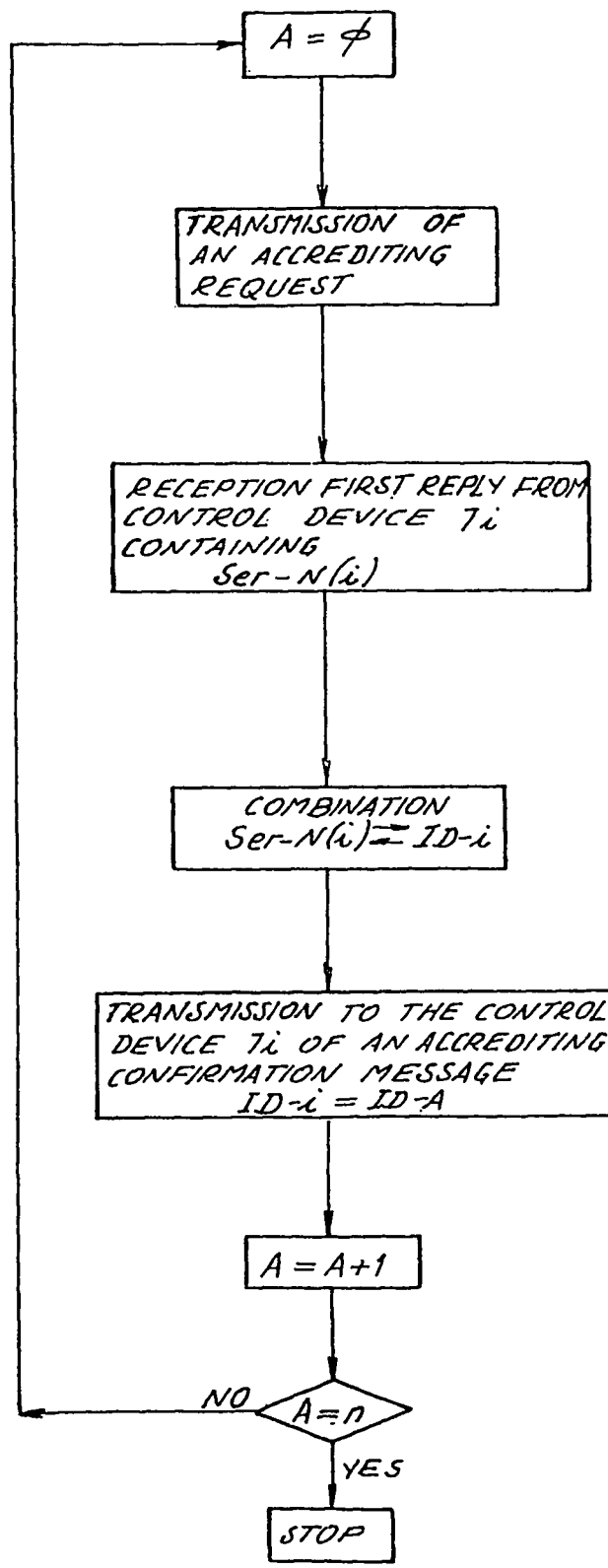
FIGS. 5 and 6 show summarizing flow diagrams of the operation of a generic control device and of the collecting unit in the accrediting phase.
Figure 6:
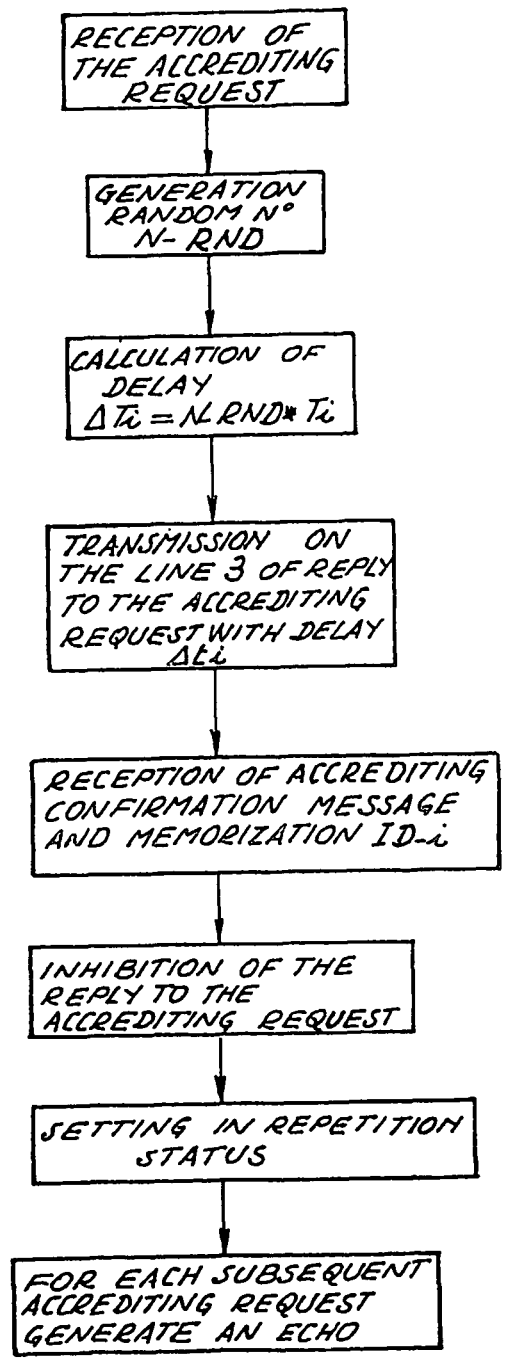

The accrediting procedure is summarized in the flow diagrams in FIG. 5 and FIG. 6, which represent the operations executed respectively by the collecting unit 5 and by the generic control device $7_i$.

Combination of identification numbers (ID_i) and serial numbers (Ser_N) allows the collecting unit 5 to inform a central control of the information coming from anyone of the control devices $7_i$ combining them with the respective serial number Ser_N(i)). This allows, for example, an operator to immediately and univocally identify via the serial number Ser_N the control device that reports a fault, in order to act promptly.

If a control device of the system is replaced with another, the collecting unit can be informed of this replacement by the central control that will replace the Ser_N of the old device with the Ser_N of the new device installed in place of the previous one. In this way the collecting unit knows which identification number is available and must be associated with the device installed in replacement and will thus execute an accrediting cycle as described above at suitable intervals until it receives the reply to the accrediting request from the new device. In this way the new control device receives a specific identification number ID_i.

In the case in which "m" further control devices are added to the system (rather than in place of others), the central control must first, for example, inform the collecting unit 5 of the new total number (n+m) of control devices 7 present in the system. At this point the collecting unit can send a command for general re-set and start a new total accrediting phase, in which it redistributes the identification number to all the control devices. Alternatively, an accrediting phase may be started in which only the m new devices installed are accredited.

FIG. 9 shows an example of embodiment of the invention applied to a photovoltaic inverter to supply power to various devices via conversion of solar power. In this figure, 101 indicates photovoltaic panels of the type per se known and destined to be installed, for example, on the roof of a house. The number 102 generically indicates sensors associated with said panels, also known in the art. The numbers 71 and 72 indicate two control devices associated with the units 101, 102 and connected, via a power line 104, to respective inverters 106. These transform the power received by the photovoltaic panels to the voltage of the normal power supply line 3. The inverters 106 are connected to control devices $7_3$ and $7_4$ analogous to the control devices $7_1$ and $7_2$ and just as these destined to transmit and receive information along the line 3 and along the lines 104. Other generic electrical appliances $1_1$, $1_2$ are also connected to the power supply line, connected to the external power supply network; these may be lighting appliances or any other electrical device requiring an electrical power supply. The number 5 indicates a data collecting unit connected to the line 3 and to a viewing unit 6.

The system schematically shown in FIG. 9 operates in the following way. The photovoltaic panels 101 supply power through conversion of the solar power captured. The power is converted by the inverters 106 and put on the power line 3. From this, power is made accessible for the various users. When required, the power may be supplied by the power supply network to which the line 3 is connected, or excess energy may be contributed into the power supply network.

All the electrical appliances (inverters, panels and sensors, generic users) are associated with respective control devices $7_i$. These communicate with the collecting unit 5 via a communication channel which, in this case, is mixed, being constituted by the power supply line 3 and by the line 104.

In this system, but also in the system described hereinbefore, transmission between the control devices $7_i$ and the collecting unit 5 may take place through a different communication channel to the one constituted by the power line for transmission, for example via radio, or via a dedicated data line, a transmission bus or in another suitable way. However, when a power supply line is provided, this is preferably also used to transmit data and information between devices connected to this line.

It is understood that the drawing only shows a possible embodiment of the invention, which may vary in forms and arrangements without however departing from the scope of the concept underlying the invention. The presence of any reference numbers in the attached claims are provided purely to facilitate reading in the light of the description hereinbefore and of the attached drawings and does not limit the scope of protection.

What is claimed is:

1. A communication method via a power line communication channel between a collecting unit and a plurality of control devices, each of which is associated with an electrical device, the method comprising steps of:

exchanging progressive messages between said collecting unit and each of said control devices via said power line communication channel, each of said progressive messages comprising a progressive message number, an addressee identification number indicating a specified one of said control devices to which a progressive message is finally addressed, and at least one of a portion of informative content and executable commands;

assigning a specific identification number to each of said control devices, said progressive messages being addressable selectively to a specified one of said control devices via said addressee identification number;

wherein said progressive messages received by said control devices are defined as received progressive messages, and when one of said control devices receives one of said received progressive messages containing an addressee identification number corresponding to its own specific identification number, said control device is identified as the specified control device and, after a delay that is unique to said specified control device relative to other of said control devices, generates and transmits a reply message in which the progressive message number contained in the reply message is equal to the progressive message number contained in the received progressive message incremented upward to a next sequential value;

wherein when each of said control devices other than the specified one of said control devices receive the received progressive message containing an addressee identification number differing from its own specific identification number, said other of said control devices are non-specified control devices and said non-specified control devices compare the progressive message number in the received progressive message to progressive message numbers from previous received progressive messages, and further wherein if the progressive message number in the received progressive message is different from progressive message numbers in previous received progressive messages, said non-specified control devices re-generate the received progressive message as an echo and, after a delay that is unique to the respective non-specified control device relative to the other of said control devices, arbitrarily transmit said echo on said power line communication channel;

wherein each non-specified control device generates and transmits echoes of received progressive messages until a reply message message in which the progressive message number is equal to the progressive message number contained in the received progressive message incremented upward to the next sequential value is received from the specified control device; and wherein each progressive message and each echo includes the addressee identification number of only the specified control device to which the progressive message was initially finally addressed such that a progressive message is transmitted from the collecting unit to the specified control device via one or more intermediate non-specified control devices without using the identification numbers of the intermediate non-specified control devices.

2. The method of claim 1, wherein the non-specified control device that generated an echo of the received progressive message addressed to a different control device, temporarily stores identifying information of said received progressive message and does not generate subsequent echoes of said received progressive message while the identifying information remains stored.

3. The method of claim 2, wherein each control device stores the identifying information of received progressive messages of which it has generated an echo in a temporary list containing identifying information of a predetermined maximum number of received progressive messages.

4. The method of claim 1, each of said progressive messages further comprising a counter, the method further comprising:

when a control device receives a received progressive message containing an addressee identification number differing from its own identification number, the control device compares a value associated with said counter to a pre-established value and transmits said received progressive message when said value is above said pre-established value.

5. The method of claim 4 further comprising:

when a control device receives a received progressive message containing an addressee identification number differing from its own identification number, said control device decreases said value of said counter prior to transmitting said echo of said received progressive message.

6. The method of claim 5, wherein an initial value of said counter is equal to a total number of said plurality of control devices.

7. The method of claim 1, wherein the delay after which each control device transmits the echo of the received progressive message is determined as a function of the identification number assigned to said control device.

8. The method of claim 7, wherein said delay is equal to the duration of the received progressive message multiplied by the identification number of the respective control device that transmits the echo.

9. The method of claim 8, wherein said collecting unit transmits said progressive messages addressed to specific control devices with a temporal interval above a maximum delay with which a previous progressive message can be regenerated via echo by all of said plurality of control devices.

10. A system comprising a collecting unit including a processor, a memory and a transmission and reception device, and a plurality of control devices, each of said control devices comprising a processor, a memory and a transmission and reception device, each of said control devices interfaced with an electrical device, said collecting unit and said control devices being connected to one another via a power line communication channel,
- wherein the collecting unit and said control devices are programmed to exchange progressive messages between said collecting unit and each of said control devices on the power line communication channel, each progressive message comprising
- a progressive message number,
- an addressee identification number indicating a specified one of the control devices to which the progressive message is finally addressed, and
- at least one of a portion of information content and executable commands;
   - wherein each control device is assigned its own identification number, said progressive messages being addressable selectively to a specified control device via said addressee identification number;
   - wherein said progressive messages received by said control devices are defined as received progressive messages, and when said control device receives a received progressive message containing an addressee identification number corresponding to its own identification number, said control device is identified as the specified control device and is programmed after a delay unique to said specified control device relative to other of said control devices to transmit a reply message in which the progressive message number contained in the reply message is equal to the progressive message number contained in the received progressive message incremented to a next sequential value;
   - wherein when the received progressive message received by said control device contains an addressee identification number differing from its own identification number, said control device is a non-specified control device and said non-specified control device
   - compares the progressive message number in the received progressive message to progressive message numbers from previously received progressive messages, and
   - if the received progressive message number is different from the message numbers in previously received progressive messages, said non-specified control device re-generates the received progressive message as an echo and after the unique delay arbitrarily transmits said echo on said power line communication channel;
   - wherein each of the control devices is further programmed such that each non-specified control device generates and transmits echoes of a received progressive messages until a reply message in which the progressive message number is equal to the progressive message number contained in the received progressive message incremented upward to the next sequential value is received from the specified control device; and
   - wherein each progressive message and each echo includes the addressee identification number of only the specified control device to which the progressive message was initially finally addressed such that a progressive message may be transmitted from the collecting unit to the specified control device via one or more intermediate non-specified control devices without using the identification numbers of the intermediate non-specified control devices.

11. The system of claim 10, wherein the non-specified control device that generated an echo of the received progressive message that is addressed to a different control device is programmed to temporarily store identifying information of said received progressive message and does not generate subsequent echoes of said received progressive message while the identifying information remains stored.

12. The system of claim 11, wherein each control device further comprises a memory, and is programmed to store the identifying information of received progressive messages it has generated an echo of in a temporary list containing identifying information of a predetermined maximum number of received progressive messages.

13. The system of claim 10, wherein each of said progressive messages further comprises a counter, and
- wherein each control device is programmed upon receiving a received progressive message containing an addressee identification number differing from its own identification number to
- compare a value associated with said counter to a pre-established value,
- decrease said value of said counter when said counter value is above said pre-established value and subsequently transmit said received progressive message.

14. The system of claim 10, wherein each of said plurality of control devices is programmed to transmit said echo of the received progressive message with its own specific delay determined as a function of the identification number assigned to said control device, and
- wherein said collector unit is programmed to transmit progressive messages addressed to specific control devices with a temporal interval above a maximum delay with which a previous progressive message can be regenerated via echo by all of said plurality of control devices.

15. A control device for electrical devices comprising:
- a processor, a memory, a connection to a corresponding electrical device, and a device for transmission and reception on a power line communication channel for the reception and the transmission of information and commands to which an identification number is assigned,
- said control device being programmed to receive and transmit progressive messages to each other control devices via said power line communication channel, each progressive message comprising
- a progressive message number;
- an addressee identification number indicating a specific control device to which the progressive message is finally addressed;
- at least one of a portion of informative content and executable commands;
- wherein said control device is further programmed so that when said control device receives a progressive message, defined as a received progressive message, containing an addressee identification number corresponding to its own identification number, said control device is identified as a specified control device for that progressive message and a reply message is generated that contains a progressive message number equal to the progressive message number contained in the received progressive message incremented upward by a predetermined value and after a delay unique to said specified control device relative to said other control devices, said replay message is transmitted on said power line communication channel;

wherein said control device is further programmed so that when said control device receives a received progressive message containing an addressee identification number differing from its own identification number, said control device is identified as a non-specified control device and compares the progressive message number in the received progressive message to progressive message numbers from previously received progressive messages, and if the received progressive message number is different from the progressive message numbers in previously received progressive messages, said control device re-generates the received progressive message as an echo and after the unique delay arbitrarily transmits said echo to the other control devices on said power line communication channel;

wherein the control device is further programmed such that a non-specified control device generates and transmits echoes of a received progressive message until a reply message message in which the progressive message number is equal to the progressive message number contained in the received progressive message incremented upward to the next sequential value is received from a specified control device; and wherein each progressive message and each echo includes the addressee identification number of only the specified control device to which the progressive message was initially finally addressed such that a progressive message may be transmitted from the collecting unit to the specified control device via one or more intermediate non-specified control devices without using the identification numbers of the intermediate non-specified control devices.

16. The control device of claim 15, the control device being further programmed to temporarily store identifying information of each received progressive message of which it generates an echo and not to generate subsequent echoes of said received progressive message while the identifying information remains stored.

17. The control device of claim 16, the control device being further programmed to store the identifying information of received progressive messages of which it generated an echo in a temporary list of identifying information relative to a maximum number of said received progressive messages.

18. The control device of claim 15, each of said progressive messages further comprises a counter, and wherein said control device is programmed upon receiving a received progressive message containing an addressee identification number differing from its own identification number to compare a value associated with said counter to a pre-established value, decrease said value of said counter when said counter value is above said pre-established value and subsequently transmit said received progressive message.

19. The control device of claim 15, wherein said control device is programmed to transmit said echo of the received progressive message received with its own specific delay determined by multiplying said identification number associated with said control device by a duration of the received progressive message.

* * * * *